April 26, 1949.  H. G. LYKKEN ET AL  2,468,337
BLADED SHEAR REDUCING MILL
Filed Feb. 28, 1944  3 Sheets-Sheet 2

INVENTORS
HENRY G. LYKKEN
WILLIAM H. LYKKEN
By Paul, Paul & Moore
ATTORNEYS

April 26, 1949. H. G. LYKKEN ET AL 2,468,337
BLADED SHEAR REDUCING MILL
Filed Feb. 28, 1944

INVENTORS
HENRY G. LYKKEN
WILLIAM H. LYKKEN
By Paul, Paul & Moore
ATTORNEYS

Patented Apr. 26, 1949

2,468,337

UNITED STATES PATENT OFFICE 2,468,337

BLADED SHEAR REDUCING MILL

Henry G. Lykken and William H. Lykken, Minneapolis, Minn.

Application February 28, 1944, Serial No. 524,160

5 Claims. (Cl. 241—55)

This invention relates to apparatus for reducing material, particularly of organic or vegetable origin such as grain and seeds to flour; pods, shells, hulls, dried vegetable matter, including saw dust to vegetable meals, flours and fillers; and any material having a resilient or toughness resistance to fracture, necessitating a shearing or clipping action to obtain effective and efficient reduction in particle size.

The invention relates more particularly to apparatus in which the reduction of the material is effected by a shearing and clipping action resulting from the fast-moving particles striking stationary shearing or cutting edges and then on the rebound being struck by fast-moving shearing or cutting edges in repeated sequence under controlled conditions to produce the desired amount of reduction, varying from comparatively coarse meal to fine powder such as by breaking the starch cell to produce free starch which is soluble in cold water.

It is an object of the invention to produce an apparatus adapted for reduction of such material to any particle size by readily effecting changes in number, type and spacing of blading, in number type and spacing of cutting edges and controlled material flow through the apparatus.

These and many other objects are inherent in the apparatus herein illustrated, described and claimed.

The invention is illustrated with respect to the drawings in which.

Figure 1:
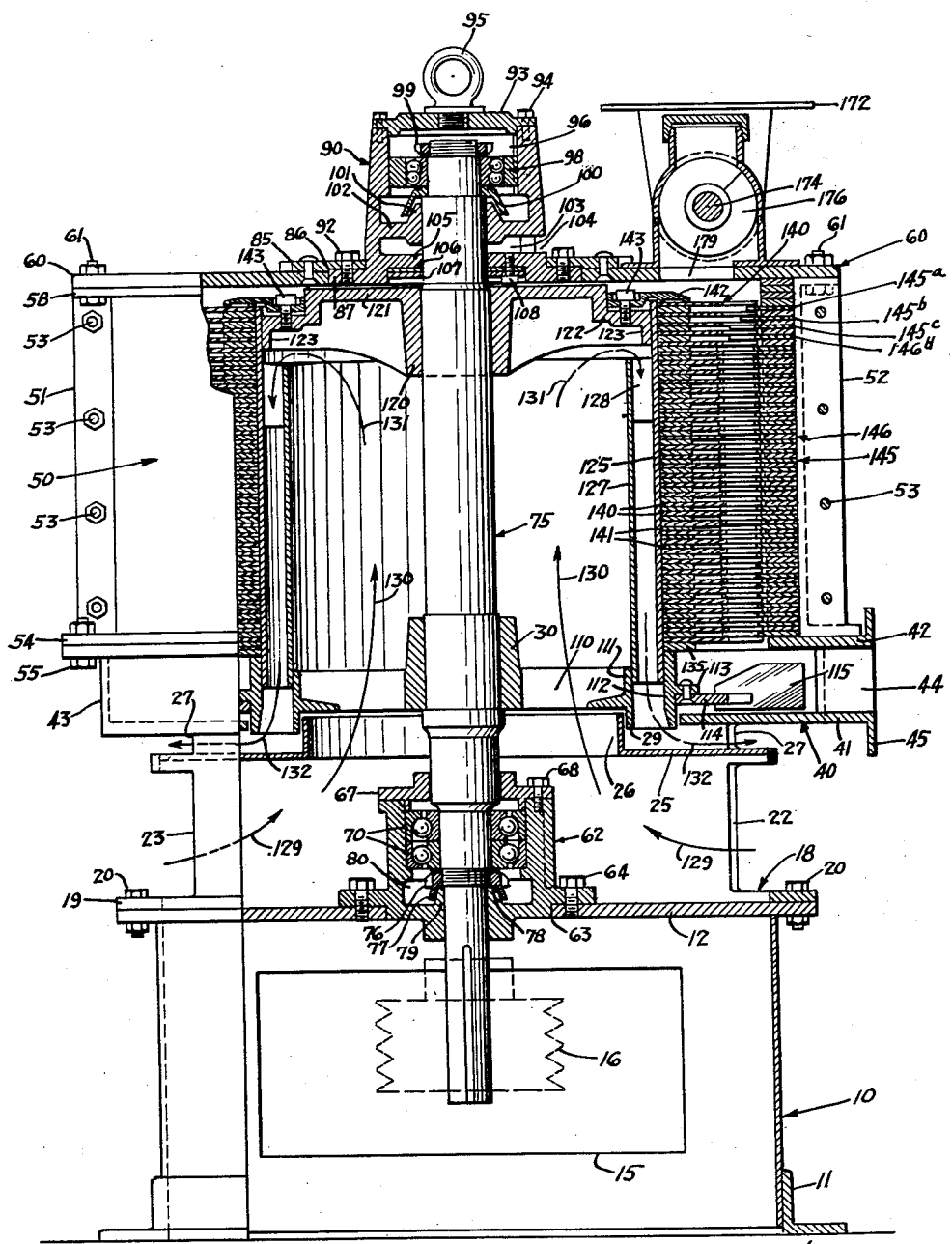
Figure 1 is a side elevational view of the pulverizing mill, partly in section and partly broken away to illustrate the interior construction thereof.
Figure 3:
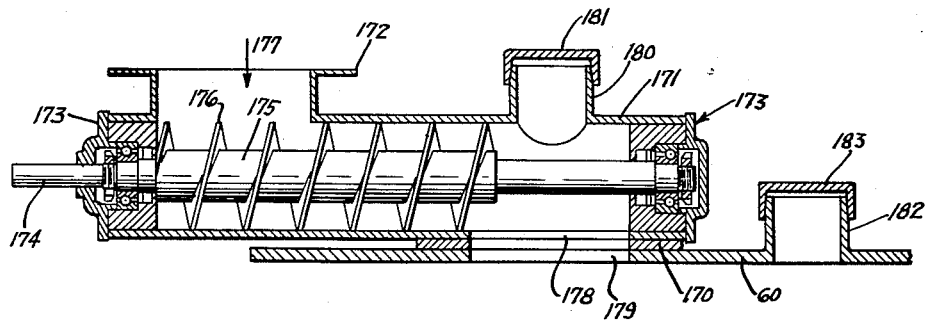
Figure 3 is a fragmentary sectional view taken along the line 3—3 of Figure 2, illustrating the material and atmosphere controlling portions of the apparatus.
Figure 6:
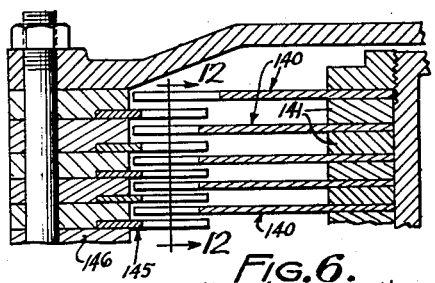
Figure 7:
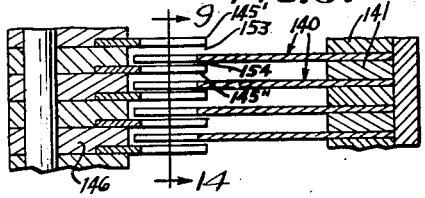
Figure 8:
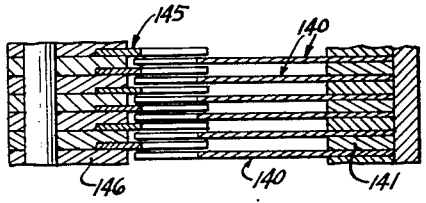

Figures 6, 7 and 8 are fragmentary sectional views illustrating various arrangements of stationary and rotating elements of the mill illustrated in Figures 1 and 3; and Figures 9, 10, 11, 12, 13 and 14 are illustrative sectional views of various types and arrangements of stationary and rotating blading. Figures 9-14 are the sectional views taken along a sectional line through the machine, such as that represented by the sectional line 15—15 of Figure 7.

It is to be understood of course that Figures 9-14 are not sectional views of Figure 7 specifically.

Throughout the drawings, corresponding numerals refer to the same parts.

Referring to the drawings, Figures 1 and 3, the pulverizing mill of the present invention includes a sub-base generally designated 10, which may conveniently be of cylindrical construction, equipped with a floor flange 11 and a bearing plate 12. The cylindrical base 10 may be cut away as illustrated at 15 so as to allow the drive belt or belts to extend into the base so as to run over pulley 16, where a belted connection is used. In Figure 1 the base 10 is of welded or riveted construction, but it is to be understood that a cast construction or other suitable construction may be utilized, if desired.

Upon the bearing plate 12 there is mounted an intermediate frame member generally designated 18 having a lower flange 19 which is bolted to the bearing plate 12 by means of through bolts 20. Intermediate frame 18 has openings 22 and 23 at either side thereof so as to allow air to circulate into the interior of the intermediate frame for a purpose to be described. Within the frame member 18 there is a diaphragm 25 preferably welded in place and equipped with a central thimble 26 extending into the lower flange 29 of hub 30.

Upon the upper surface of the intermediate frame there is mounted a base plate generally designated 40 constituting the lower end cover of the mill housing. The end cover consists of a lower wall 41 and an upper wall 42 closed at the periphery by means of a circular outer wall 43. The outer wall is cut away at one part so as to provide for the outlet port 44 which is equipped with a flange 45 for convenient attachment of a discharge duct of the mill. Upon plate 42 there is mounted an outer cylindrical shell 50 of the machine which, for convenience, is made in two or more sections bolted together at flanges 51 and 52 by means of bolts 53. Shell 50 has bottom flange 54 which is attached to the upper plate 42 of the base by means of the bolts 55 and a top flange 58 which is attached by means of bolts 61 to a cover plate 60 of the machine.

The cover plate 12 and the bearing plate 60 are each provided with bearing housings for the rotating element of the mill. Thus plate 12 is provided with a bearing housing 62 which is attached at a central opening 63 of plate 12 by means of studs 64. The bearing housing 62 is provided with a cover plate 67 which is attached to the housing by means of studs 68, the cover 67 serving to hold in place a double race set of, preferably, preloaded ball bearings 70. The inner race of the bearings is mounted on a shaft generally designated 75 and is held in place by means of a locking nut 76. The locking nut is preferably equipped with a downwardly extending oil slinger skirt 77 which extends below the upper surface 78 of a central enlargement 79 in the lower wall of the bearing housing. The space 80 within the housing serves as an oil reservoir from which oil cannot easily flow because of the wall 79 on the center of the base. It is to be understood, of course, that the enlargement 79 of the base of the bearing housing 62 and the thickened central portion of the cover 67 are bored out so as to allow a slight clearance in respect to the corresponding portions of the shaft 75.

The cover plate 60 is provided with a ring-shaped auxiliary plate 85 which is riveted or otherwise attached in concentric relation with respect to the central opening 86 in the cover plate so as to form a circular notch into which the flange 87 of the upper bearing housing generally designated 90 is received. The flange 87 is firmly held in the housing by means of studs 92 and the bearing housing is thus firmly attached to the cover.

The bearing housing 90 is provided with a cover 93 which is held in place by studs 94 and serves as a connection for the hoisting eye 95. Within the housing there is a recess 96 in which there is positioned a ball bearing assembly 98, the latter being fastened to the upper end of the shaft 75 by means of the retaining nut 99. Beneath the ball bearing assembly there is provided an oil slinger ring 100 which extends down alongside the central boss 101 formed in the intermediate wall 102 of the bearing housing. Below the intermediate wall there is an additional space 103 which is vented to the exterior of the bearing housing by means of the port 104 so as to permit any oil drainage that might escape to drain to the exterior of the machine rather than to enter into the interior thereof. The lower wall 105 of the bearing housing is recessed at 106 and in the recess there is positioned an oil retainer ring 107 of felt, spring-pressed leather or other conventional design, held in place by means of the studs 108. Upon the shaft 75 there is mounted a hub 30 having spokes 110 extending to an inner flange 111, which is in turn connected by a plurality of webs to an outer flange 112. The outer flange 112 is provided with a peripheral rib 113 to which there is attached a ring 114 having mounted thereon a plurality of fan blades 115 which operate in the interior of the fan and discharge cavity between lower wall 41 and upper wall 42 of the base member 40. Upon the upper end of shaft 75 there is mounted a hub 120 which is connected by means of a solid flange 121 to an offset rim 122. Upon the periphery of the rim 122 there is mounted a sturdy steel shell 125 which fits into the interior of the flange 112 at the bottom of the rotor. Within the cylinder 125 there is a second smaller cylinder 127 which is fastened to the flange 111 at the lower part of the rotor and is anchored at its upper portion to the outer cylinder 125 by means of a plurality of webs 128.

Within the rotor there is accordingly defined a path for cooling air which enters the intermediate frame member at openings 22 and 23, as indicated by arrows 129. The air flows inwardly from the openings and thence through the thimble 26, thence through the openings between the spokes 110, as indicated by arrows 130 and into the interior of cylinder 127. The air continues along the path indicated by arrows 131 past the webs 128 and through the annular space between cylinders 125 and 127 and thence outwardly between the flanges 111 and 112 into the space between diaphragm 25 and lower wall 41, as indicated by the arrows 132 and through the openings 27 to the exterior. Interior radial fan blading may be included between the hub 120 and the inner surface 123 of the shaped flange 122 and spokes 110, and/or the webs between rims 111 and 112 shaped like fans, if desired, so as to produce a fan action further enhancing the flow of air from the interior of cylinder 127 into the annular space between the cylinders 125 and 127. However, for the most part the centrifugal forces on the air are ordinarily sufficient to cause the air to flow through the path described. The cooling air may be pre-cooled below ambient temperatures, if desired, to accentuate the cooling effect, where particularly heat sensitive materials are being handled in the mill.

Upon the exterior of cylinder 125 there is mounted an end ring 135 of fairly heavy construction which forms a seat for the stack of blading, and then throughout a portion or all of the exterior surface of the cylinder 125 there are alternately stacked blade rings generally designated 140 and spacer rings 141 in alternate succession, and the stack of rings and spacers are clamped in place at the upper end by means of a clamping plate 142 which is held in place by a plurality of studs 143 which thread into the shaped rim 122 of the upper hub. The studs 143 are preferably recessed into the clamping plate 142, and may be of the hexagonally headed type or the type having a hexagonal recess in the uppermost face of the head.

Within the cylindrical shell 50 there are likewise stacked a plurality of stationary blade rings generally designated 145 with spacer rings between successive blade rings, all held in place between plates 42 and 60 of the outer housing.

Figures 4, 5:
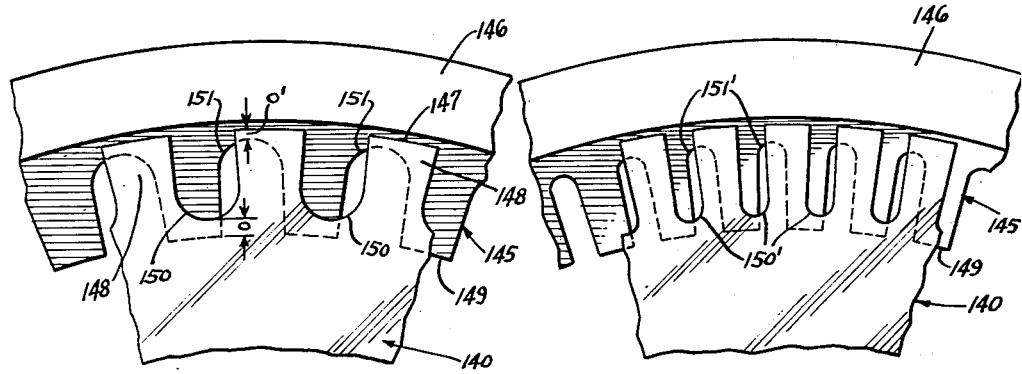
Figures 4 and 5 are enlarged fragmentary plan views of the stationary and rotating elements of the mill shown in Figures 1 and 3.

Referring to the enlarged views in Figures 4–14 there are illustrated fragments of the rotary and stationary blade structure. As shown in Figures 4 and 5 the rotary blade 140 has a diameter such that clearance is afforded at 147 between the tips of teeth 148 and the stationary spacer rings 146. The internal diameter of the ring constituting the stationary blade ring 145 is shown at 149 and is preferably such that an overlap of distance "O" is provided between the root diameter of the notches 150 in the rotary blading and the interior diameter of the stationary blade 145. Likewise the notches 151 of the stationary blading 145 are of such a depth in respect to the crest diameter of the rotary blading 140 that an overlap of distance "O" is provided.

The notches 150 in the rotor blading and notches 151 in the stationary blading may be round-bottomed, as illustrated, or of any other desired configuration and a small or large number of notches may be provided throughout the periphery of the blading, depending upon the service in which the pulverizing mill is used. For certain types of material being pulverized, it is preferable to have a large number of small notches, as illustrated at 150' and 151' in Figure 5, while for other types of pulverizing or grinding the small number of larger notches may be utilized, as in Figure 5.

The thickness of the stationary blades 145 and spacer washers 146 in respect to the rotary blades 140 and spacer rings 141 may be varied from a wide spacing as shown at the top of Figure 6 to a narrow spacing, as shown at the bottom of Figure 6, or the stationary and rotary blading may be arranged in a uniform spacing, as illustrated in Figure 8. As shown in Figure 7, it is desirable, in some instances, to provide a wider clearance at 153 between the upper part of the rotary blade 140 and the next higher stationary blade 145', than at 154 between the lower part of the same rotary blade and the next lower stationary blade 145''. For many pulverizing operations the clearance between the rotary blades 140 and the stationary blades 145 is but a few thousandths of an inch, as illustrated in exaggerated form in Figure 8. The rotary blades 140 may have the same or a different number of notches as the stationary blades associated with them. In all of the rotary and stationary blading, however, the notches define sharp edges which provide for a clipping or shearing action upon the particles engaged.

Figures 9, 10:
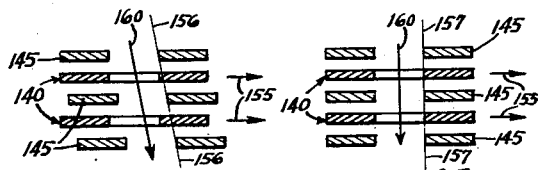
Figures 11, 12:
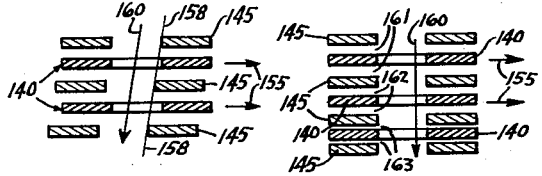

Referring to Figures 9-14 there are illustrated several modifications for stacking the rotary and stationary blading. In Figures 4-9 the rotary blades are illustrated at 140, whereas the stationary blades are illustrated at 145. Arrows 155 illustrate the direction of rotation of the rotary blades with respect to the stationary blades. It will be observed in Figure 9 that each succeeding stationary blade from bottom to top in the stack is spaced backward in respect to the direction of rotation, as indicated by the line 156—156. The feeding of materials through the blading is somewhat enhanced by this arrangement. In Figure 10 the stationary blades 145 are stacked so that the notches in the blades are directly over each other as indicated by the line 157—157 thus providing a somewhat slower feeding of the material through the blading. In Figure 11 the stationary blades 145 are stacked so that each lower blade is positioned backward in respect to the direction of rotation, as indicated by the line 158—158, thus providing the slowest feed of material through the mill. In all of the Figures 9-14 the general direction of the material flow through the mill is denoted by arrows 160, but this should not be understood to represent the movement of any one particle of material.

Figure 12 illustrates the sectioning along the lines 13—13 of Figure 6 and illustrates the decrease in clearance between the rotary blades 140 and the stationary blades 145 from top to bottom in the mill. Thus, at the upper part of the mill there is a relatively wide clearance between rotary blades 140 and adjacent stationary blades 145, as illustrated at 161, while the clearance is decreased at the next lower blade, as illustrated at 162, and is a minimum at 163. The dimensions given are, of course, merely illustrative.

Figures 13, 14:
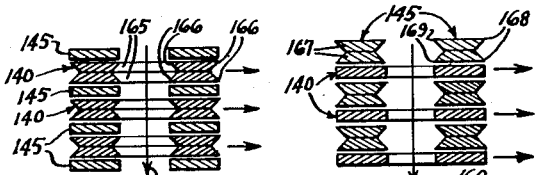

In Figures 13 and 14 there are illustrated compound rotary and stationary blading. Thus, in Figure 13 the rotary blades generally designated 140 are composed of two plates 165 which are sharpened so as to present knife edges at 166. The blades are then assembled in the manner illustrated and as a result material fed through the mill in the general direction of arrow 160 is subject to impacted cleavage at knife edges 166. In Figure 13 the stationary blades 145 have straight-cut notches, as previously described. In Figure 14 the stationary blades 145 are composed of two elements 167 which are sharpened so as to present knife edges 168 and 169 while the rotary blades 140 are of the type having straight cut teeth, as previously described.

The type of blading chosen, the number of teeth, the number of teeth on the rotary blading as compared to the number of teeth on the cooperating stationary blading, the angularity of cut of the notches, whether straight cut or sharp-edge cut, the clearance, blade material and other factors, all depend upon the type of material being pulverized, the degree of fineness desired and other conditions. In all instances, however, the sharp corners of the teeth provide efficient cutting edges which shear and clip the particles undergoing milling. When wear occurs the notches may be recut or ground so as to present fresh sharp edges so as to maintain the efficiency of the mill.

Referring to Figure 1 it will be observed that the upper four stationary ring blades 145a, 145b, 145c, and 145d have successively decreasing internal diameters until, as illustrated for the five stationary bladings, the internal diameter reaches the amount described with reference to Figures 4 and 5. The passage of material through the mill is thus facilitated through the first several courses of rotary or stationary blading, and thus facilitates flow at a time when the pulverization of the material may not yet be sufficiently great to facilitate fluid flow of the material in air or other gaseous dispersion.

Figure 2:
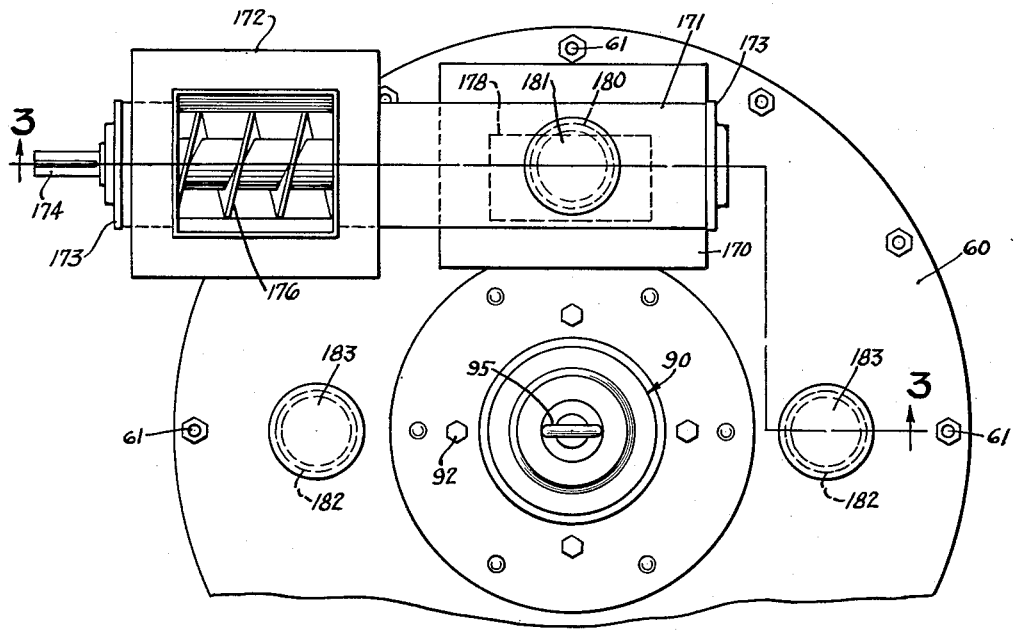
Figure 2 is a partial plan view showing the top of the mill illustrated in Figure 1.

In Figure 1 the feed of the dry material is by means of a worm-feeding apparatus best shown in Figures 2 and 3. The worm feeding apparatus consists of a base plate 170 to which there is mounted a cylindrical member 171 provided at its outer end with a flanged hopper 172. The cylindrical member is provided at each end with a closure plate and bearing assembly generally designated 173 which serves rotatively to support the worm shaft 174 having on it the enlarged worm-carrying section 175 wherein the feed worm itself is designated 176. Dry material is fed into the hopper at 177 and is forced endwise by means of the worm until it reaches the discharge port 178 where the material falls through an opening 179 in the top plate 60 of the mill and directly onto the uppermost rotary blade 140. The cylindrical member 171 of the dry material feeder is provided with an offset nipple 180 having a screw cap 181 which may be removed, as desired, for inspection and also to permit a predetermined quantity of air to flow through the mill. Additional air or inert gas inlets are provided in the top cover 60, as shown at 182, each being provided with a removable cap 183.

In operation, a mill of the type illustrated in Figure 1 is first brought up to speed by suitable power drive to V-belt pulley 16. Air, which may be precooled if desired, is drawn into the interior of the rotor structure as previously described and is scrubbed along the inside surface of the cylinder 125 and thence is discharged through ports 27 beneath the lower wall 41 of the base plate 40. The dry material being pulverized is then fed into the machine by means of the feeding apparatus, which is suitably driven at slow speed and one or more of the caps 181—183 are removed so as to permit a predetermined amount of air to be drawn into the mill for facilitating a flow of the dry material therethrough. If desired, inert gases may be conducted to the nipples 180—182 in the event the material undergoing pulverizing is sensitive to oxidizing conditions. Only enough air or inert gas is admitted into the mill to permit the formation of an "apparent fluid" composed of the material being pulverized and the air or inert gas. If desired, the air or inert gas so admitted may be pre-cooled so as to maintain the material being milled at desirably low temperature. This is particularly true of heat sensitive or heat softening organic materials such as starch, cocoa, resins and the like. A relatively small amount of air or gas is required for the purpose of forming the "apparent fluid" of the air or gas and the material being milled. Even a small amount of air or gas so admitted to the highly agitated solid material forms an "apparent fluid" which flows in much the same manner as real fluid such as water or oil. As the solid material enters the region of the rotary and stationary blading, it is subjected to progressive reduction in particle size by repeated shearing and clipping action as the individual particles are brought into contact at high speed with the sharp edges of the stationary and rotating teeth. As a result exceedingly fine pulverizing can be obtained. For example, by utilizing the apparatus of the present invention it is possible to obtain starch particles of almost colloidal dimensions with the result, there is obtained starch which is soluble in cold water. Heat sensitive material, for example cocoa, resins and the like, may readily be pulverized without damage, due to the fact that cooling air is supplied and scrubbed against the interior of the mill rotor, and because the air or gas admitted may be pre-cooled, with the result that excessive temperature rise is prevented. The air or gas admitted may be inert to the material being treated. Thus, with some materials, carbon dioxide or carbon monoxide may be used, whereas with other materials there may be used nitrogen or rare gases such as helium.

The pulverized material discharged from the lowermost of the rotary bladings passes into the annular fan housing formed by plates 41 and 42 of the exterior wall 43 and is discharged outwardly through port 44 by the action of plates 115. The entire movement of the solid material and suspending gases through the mill is due to the fan action produced by fan blades 115 and the amount of air or gas drawn through the mill may thus conveniently be adjusted by regulating the number and sizes of the openings at nipples 181—182.

As many apparently widely different embodiments of this invention may be made without departing from the spirit and scope thereof, it is to be understood that we do not limit ourselves to the specific embodiments herein except as defined by the appended claims.

What we claim is:

1. A mill comprising a cylindrical frame closed at one end, journals mounted on the frame coaxially with the cylindrical frame, a shaft rotatably mounted in the journals, a solid flange on the shaft near the closed end of the cylindrical frame, a hollow cylindrical rotor of a diameter smaller than the inside of the cylindrical frame and having a length shorter than said frame and mounted on the solid flange for rotation therewith, a flanged wheel relatively open adjacent its center mounted on the shaft and supporting the other end of the hollow cylindrical rotor, an internal cylinder having a length shorter than the cylindrical rotor mounted on the flanged wheel and positioned concentrically within the cylindrical rotor so as to form an inner axial path for gases in the direction of the shaft and towards the closed flange from which the end of the internal cylinder is spaced, a diaphragm mounted at right angles to the shaft and adjacent the flanged wheel, said diaphragm having an inturned flange at its center of a diameter and positioned so as to form an air path entrance through the relatively open-centered wheel to the interior of the internal cylinder, said flanged wheel also being provided with openings in its flange and located at a diameter so as to be between the cylindrical rotor and internal cylinder, forming a path for the discharge of gases flowing axially between said cylinder, and cooperating milling elements mounted on the inside of the cylindrical frame and on the outside of the cylindrical rotor and projecting into the space therebetween.

2. An apparatus of the type set forth in claim 1 further characterized in that the flanged wheel has radially spaced inner and outer circumferential flanges with openings therebetween and supported by an integral spider mounted on the shaft, the inner circumferential flange being of a diameter so as to nest with and support the internal cylinder and the outer flange being of a diameter so as to nest with and support the cylindrical rotor.

3. The apparatus of claim 1 further characterized in that the flanged wheel has blower blading mounted thereon and the cylindrical frame includes a fan space for cooperatively receiving said blading to form a fan chamber, said chamber being open axially to the space between the cylindrical frame and rotor to receive milled material and a carrier fluid therethrough, said fan space being provided with a radial outlet.

4. The apparatus of claim 1 further characterized in that means is provided to produce a suction on one end of the space occupied by the milling elements, the frame being provided at its opposite end with a solid material feed into the space occupied by the milling elements and aperture means leading into said space, said aperture means being capable of being opened to regulated amounts for the inflow therethrough of carrier fluid along with the solid material fed.

5. A mill comprising a hollow frame of circular interior cross-section, milling elements mounted on the interior of said frame, a rotor journaled in the frame, said rotor being hollow, of circular cross-section, and smaller than the frame so as to allow a space between the rotor and the frame, said rotor being open at one end and closed at the other end, milling elements mounted on the exterior of the hollow rotor in cooperating relationship with the milling elements mounted on the interior of the cylindrical frame, an inner cylindrical duct of relatively large diameter extending into the hollow rotor and spaced endwise a short distance from the closed end thereof and similarly spaced from the inside of the rotor, and duct-work on the frame for introducing air into the inside of the inner cylindrical duct for flow axially thereof in a direction towards the closed end of the rotor and thence outwardly and into the space between the outside of the duct and the inside of the rotor; for reverse flow axially between said duct and the inside of the rotor towards the open end of said rotor, said frame being formed with an outlet for discharge of cooling air therethrough.

HENRY G. LYKKEN.
WILLIAM H. LYKKEN.

(References on following page)

REFERENCES CITED

The following references are of record in the file of this patent:

UNITED STATES PATENTS

| Number | Name | Date |
|---|---|---|
| 24,058 | Russell | May 17, 1859 |
| 28,989 | Joslin | July 3, 1860 |
| 50,984 | Bearly | Nov. 14, 1865 |
| 74,682 | Greenleaf | Feb. 18, 1868 |
| 287,360 | Bell | Oct. 23, 1883 |
| 862,720 | Day | Aug. 6, 1907 |
| 1,321,801 | Bausman | Nov. 18, 1919 |
| 1,793,691 | Green | Feb. 24, 1931 |
| 1,840,827 | Albert | Jan. 12, 1932 |
| 1,977,955 | Robinson | Oct. 23, 1934 |
| 2,077,226 | DeBethune | Apr. 13, 1937 |
| 2,105,766 | Francis | Jan. 18, 1938 |
| 2,169,338 | Ditto | Aug. 15, 1939 |
| 2,204,140 | Langbein | June 11, 1940 |
| 2,255,213 | Good | Sept. 9, 1941 |

FOREIGN PATENTS

| Number | Country | Date |
|---|---|---|
| 26,826 | Germany | May 3, 1884 |
| 530,253 | Germany | July 24, 1931 |
| 341,317 | France | June 6, 1904 |
| 444,684 | Great Britain | Mar. 25, 1936 |